(No Model.)

M. M. SMITH.
PISTON.

No. 490,724. Patented Jan. 31, 1893.

WITNESSES
J. G. Bundick
A. Nielsen

INVENTOR
Minard M. Smith
Per A. Vrarkas Atty

UNITED STATES PATENT OFFICE.

MINARD M. SMITH, OF BROOKLYN, NEW YORK.

PISTON.

SPECIFICATION forming part of Letters Patent No. 490,724, dated January 31, 1893.

Application filed May 9, 1892. Serial No. 432,338. (No model.)

*To all whom it may concern:*

Be it known that I, MINARD M. SMITH, a citizen of the United States, and a resident of Brooklyn, in the county of Kings and State of New York, have invented certain new and useful Improvements in the Pistons of Steam-Engines, of which the following is a specification.

Figure 1:
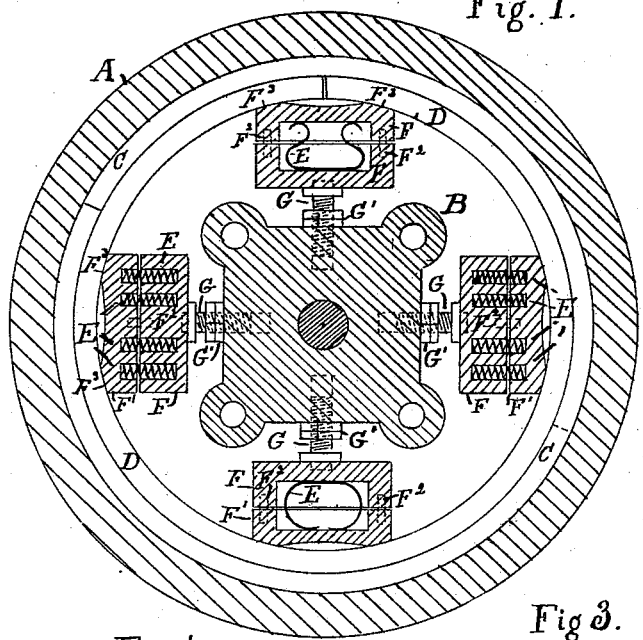
Figure 4:
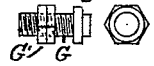
Figure 3:
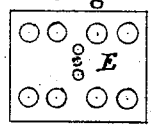
Figure 2:
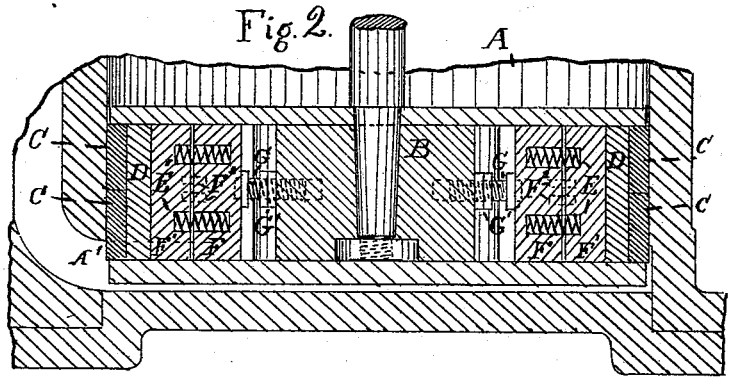

My invention relates more particularly to pistons with ring packing, supported by springs, as shown in the accompanying drawings of which Figure 1, is a transverse section of a steam engine cylinder and piston, showing the arrangement of the springs and their casings. Fig. 2, is a longitudinal section of a portion of a steam cylinder and piston. Fig. 3, is a view of one of the casings. Fig. 4 is a detail showing the adjusting screw.

The same letters refer to the same parts throughout.

The object of my invention is to produce a more efficient and durable packing spring than is now made. For this purpose I inclose the springs of whatever form in casings or blocks, so made that when the springs have yielded all that may be necessary the blocks, or casings, will meet and relieve the springs from any excessive compression, resulting from the bounding or knocking of the piston in the cylinder; which excessive compression, I find to be, although slight in extent, yet by reason of its numberless repetitions, the principal cause of breakage of the ordinary springs.

In my improvement as shown A. is a portion of a steam cylinder of the usual construction.

B. is the piston. C. C. the packing rings, D. the bull ring, which may be omitted in small cylinders.

E. E. are the springs inclosed in their casings F. F'. which are adjusted by means of the screws G, secured by the nuts G'. The casings F. F'. are provided with dowel or guide pins $F^2$. to keep them in their proper relative positions. The casings F. F'. are so made that, when the springs E are adjusted to the desired tension, the casings F. F'. will be separated by only just so much space as is necessary for the free passage of the piston B. in the cylinder A. Thus by the closing of F. F'. the natural vibrations of the springs E. are interrupted and the lateral rebounding of the piston prevented; notably, at the end of the stroke when the steam is suddenly admitted through the port A', which is at one side of the cylinder. The outer surface of the casing F'. is fitted to the curved inner surface of the ring D. at the ends $F^3$, but left slack thereof in the middle, so that it may allow the ends of D to act freely and naturally.

The casing F. is provided with a socket for the screw G. which keeps it in position. The casings F. F'. may be of iron, or brass, or any other suitable material, while the form or size thereof may be varied to suit each particular case.

The springs E. may be of any suitable material or form; I have found the plain helical form, of such size that a number may be placed in each casing as shown, very convenient and efficient, permitting their total power to be easily regulated by simply increasing or decreasing the number of springs in the casings, without changing the casings or other parts at all. These springs and casings can be applied to any ordinary steam piston, and should be so adjusted as to hold the piston central in the cylinder when at rest, and with the casings F. F'. so close as to permit of only a sixty-fourth of an inch of lateral movement, unless the cylinder is very badly worn; observe that with these casings a weakened, or breaking spring gives no more lateral play to the piston than a strong one does.

Having thus described the nature, and uses of my invention; I claim

1. In the piston of a steam cylinder the casings F, F', in combination with the springs E, rings D, and C, adjusting screws G, and piston B, when constructed and operated substantially as, and for the purposes herein shown and set forth.

2. In a steam piston the casings F, F', having the guides $F^2$, and curved surfaces $F^3$, in combination with the springs E, rings D, and C, and adjusting screw G, having the nuts G', when constructed and operated substantially as, and for the purposes herein shown and described.

Signed at New York, in the county of New York and State of New York, this 5th day of May, A. D. 1892.

MINARD M. SMITH.

Witnesses:
SANFORD DUNBAR,
ALOHA VIVARTTAS.